(12) United States Patent
Sumihara

(10) Patent No.: US 8,708,357 B2
(45) Date of Patent: Apr. 29, 2014

(54) STEERING SYSTEM

(71) Applicant: JTEKT Corporation, Osaka (JP)

(72) Inventor: Hidetoshi Sumihara, Kitakatsuragi-gun (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/779,240

(22) Filed: Feb. 27, 2013

(65) Prior Publication Data

US 2013/0234410 A1   Sep. 12, 2013

(30) Foreign Application Priority Data

Mar. 8, 2012   (JP) ................................ 2012-051890

(51) Int. Cl.
*B62D 3/12*   (2006.01)
*B62D 5/22*   (2006.01)

(52) U.S. Cl.
CPC   *B62D 3/12* (2013.01); *B62D 3/123* (2013.01); *B62D 5/22* (2013.01)
USPC ...................................... 280/93.514; 74/498

(58) Field of Classification Search
CPC ............. B62D 3/12; B62D 3/123; B62D 5/22
USPC ........................................ 280/93.514; 74/798
See application file for complete search history.

(56) References Cited

U.S. PATENT DOCUMENTS

| 3,064,491 | A | * | 11/1962 | Bishop ............................ 74/437 |
| 3,753,378 | A | * | 8/1973 | Bishop ............................ 74/422 |
| RE28,740 | E | * | 3/1976 | Bishop ............................ 74/422 |
| 4,444,070 | A | * | 4/1984 | Yanai .............................. 74/422 |
| 4,475,413 | A | * | 10/1984 | Higuchi ......................... 74/422 |
| 4,619,155 | A | * | 10/1986 | Futaba ........................... 74/498 |
| 4,788,878 | A | * | 12/1988 | Morita et al. .................. 74/422 |
| 4,890,683 | A | * | 1/1990 | Matsuda et al. ............. 180/444 |
| 5,473,960 | A | * | 12/1995 | Sakamoto et al. ............ 74/422 |
| 6,470,993 | B1 | * | 10/2002 | Matsuda et al. ............. 180/444 |
| 6,585,074 | B2 | * | 7/2003 | Katou et al. ................. 180/428 |
| 6,845,993 | B2 | * | 1/2005 | Shirai ...................... 280/93.514 |
| 7,726,439 | B2 | * | 6/2010 | Akuta et al. ................. 180/444 |

(Continued)

FOREIGN PATENT DOCUMENTS

EP   0 765 793 A2   4/1997
EP   0 915 004 A2   5/1999

(Continued)

OTHER PUBLICATIONS

Extended European Search Report issued in European Patent Application No. 13157733.0 dated Jun. 26, 2013.

*Primary Examiner* — Nicole Verley
(74) *Attorney, Agent, or Firm* — Oliff PLC

(57) ABSTRACT

A pinion shaft of a steering system has a plurality of pinion teeth. A rack shaft has a stroke region in which a plurality of rack teeth that mesh with the pinion teeth is formed. The stroke region includes a center region that includes a center position of the stroke region, end regions, each of which includes an end position of the stroke region, and intermediate regions, each of which is located between the center region and one of the end regions. A pressure angle of each rack tooth included in each of the intermediate regions is smaller than a pressure angle of each rack tooth included in each of the center region and the end regions.

6 Claims, 5 Drawing Sheets

(56) References Cited

U.S. PATENT DOCUMENTS

| | | | |
|---|---|---|---|
| 8,205,897 B2 * | 6/2012 | Avigni | 280/93.514 |
| 8,348,541 B2 * | 1/2013 | Mahlmann et al. | 403/122 |
| 8,376,379 B2 * | 2/2013 | Park et al. | 280/93.514 |
| 8,465,034 B2 * | 6/2013 | Heo | 280/93.515 |
| 8,613,459 B2 * | 12/2013 | Yang et al. | 280/93.514 |
| 2008/0223163 A1 | 9/2008 | Yamazaki et al. | |

FOREIGN PATENT DOCUMENTS

| | | | | |
|---|---|---|---|---|
| GB | 2030262 A | * | 4/1980 | F16H 19/04 |
| JP | 57073268 A | * | 5/1982 | F16H 55/26 |
| JP | A-2005-199776 | | 7/2005 | |

* cited by examiner

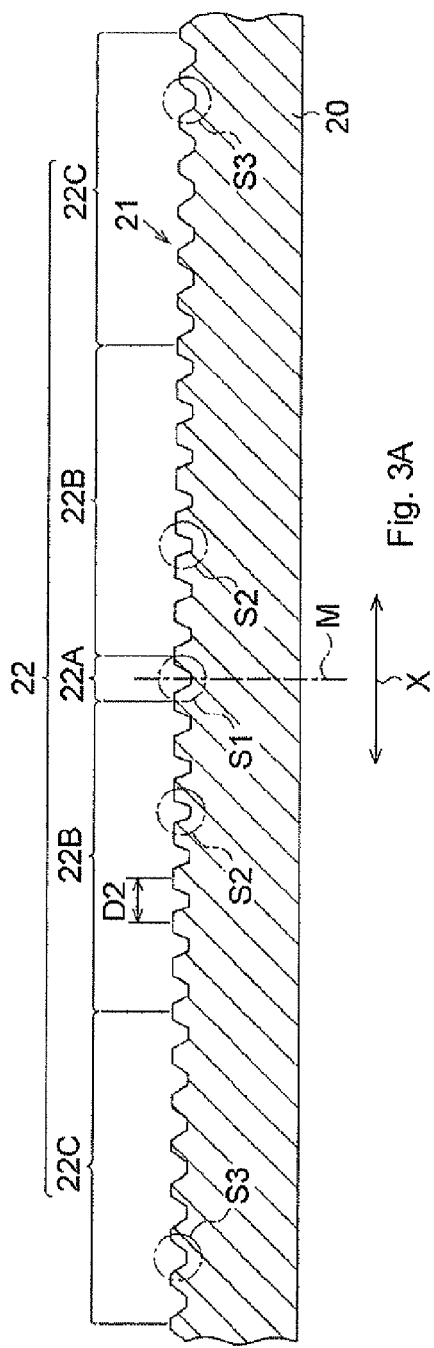
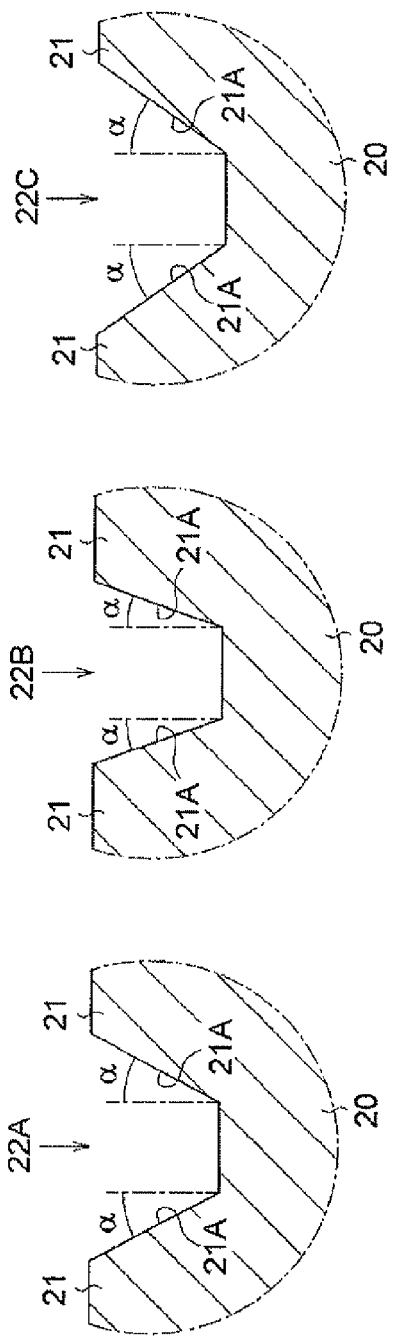

STEERING SYSTEM

INCORPORATION BY REFERENCE/RELATED APPLICATION

This application claims priority to Japanese Patent Application No. 2012-051890 filed on Mar. 8, 2012 the disclosure of which, including the specification, drawings and abstract, is incorporated herein by reference in its entirety.

BACKGROUND OF THE INVENTION

1. Field of the Invention

The invention relates to a steering system that includes a pinion shaft, a rack shaft and a support yoke.

2. Discussion of Background

A rack-and-pinion steering system includes a pinion shaft, a rack shaft and a rack guide mechanism. The pinion shaft has a plurality of pinion teeth. The rack shaft has a plurality of rack teeth. US 2008/0223163 A1 describes a steering system that includes a pinion shaft and a rack shaft, The rack guide mechanism includes a support yoke, an urging member and a restricting member. The support yoke guides movement of the rack shaft. The urging member applies, to the support yoke, a force that acts in an urging direction that is a direction in which the support yoke is pressed against the rack shaft. The restricting member is located on the side of the support yoke and the urging member in an anti-urging direction, which is a direction opposite to the urging direction. The restricting member faces, via a clearance, an end portion of the support yoke in the anti-urging direction.

The steering feel is influenced by the magnitude of rotational resistance against the pinion shaft in the steering system. The magnitude of rotational resistance against the pinion shaft changes on the basis of the magnitude of reaction force that the pinion shaft receives from the rack shaft due to meshing between the pinion teeth and the rack teeth.

The magnitude of reaction force changes on the basis of a force that is applied from the urging member to the rack shaft via the support yoke. The magnitude of force that is applied from the urging member to the support yoke changes on the basis of the size of the clearance between the end portion of the support yoke in the anti-urging direction and the restricting member. Therefore, by controlling the size of the clearance between the end portion of the support yoke in the anti-urging direction and the restricting member, it is possible to adjust the magnitude of rotational resistance against the pinion shaft and the steering feel.

In the above-described steering system, when the pinion shaft rotates, the rack shaft receives a force in the anti-urging direction due to the meshing between the rack teeth and the pinion teeth. Therefore, the rack teeth are separated from the pinion teeth. The rack teeth, which have been separated from the pinion teeth, contact the pinion teeth again due to the action of a force that is applied from the urging member to the rack shaft via the support yoke. Then, gear rattle is generated when the rack teeth contact the pinion teeth.

Therefore, it is desirable to take measures for suppressing generation of such gear rattle. However, the steering system is required to provide good steering feel. Therefore, when the above-described measures are taken, it is desirable to take into account the influence on the steering feel.

SUMMARY OF THE INVENTION

The invention provides a steering system with which generation of gear rattle is suppressed and the steering feel is improved.

According to a feature of an example of the invention, a steering system includes: a pinion shaft that has a plurality of pinion teeth; a rack shaft that has a stroke region in which a plurality of rack teeth that mesh with the pinion teeth is formed, and in which the stroke region includes a center region that includes a center position of the stroke region, end regions, each of which includes an end position of the stroke region, and intermediate regions, each of which is located between the center region and one of the end regions, and a pressure angle of each of the rack teeth included in each of the intermediate regions is smaller than a pressure angle of each of the rack teeth included in each of the center region and the end regions; a support yoke that guides movement of the rack shaft; an urging member that applies force, which acts in an urging direction that is a direction in which the support yoke is pressed against the rack shaft, to the support yoke; and a restricting member that is located on a side of the support yoke and the urging member in an anti-urging direction, which is a direction opposite to the urging direction, and that faces, via a clearance, an end portion of the support yoke in the anti-urging direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3A to FIG. 3D are sectional views that show sectional structures of rack teeth in the steering system according to the embodiment;

DETAILED DESCRIPTION OF EMBODIMENTS

Hereinafter, embodiments of the invention will be described with reference to the accompanying drawings.

Figure 1:
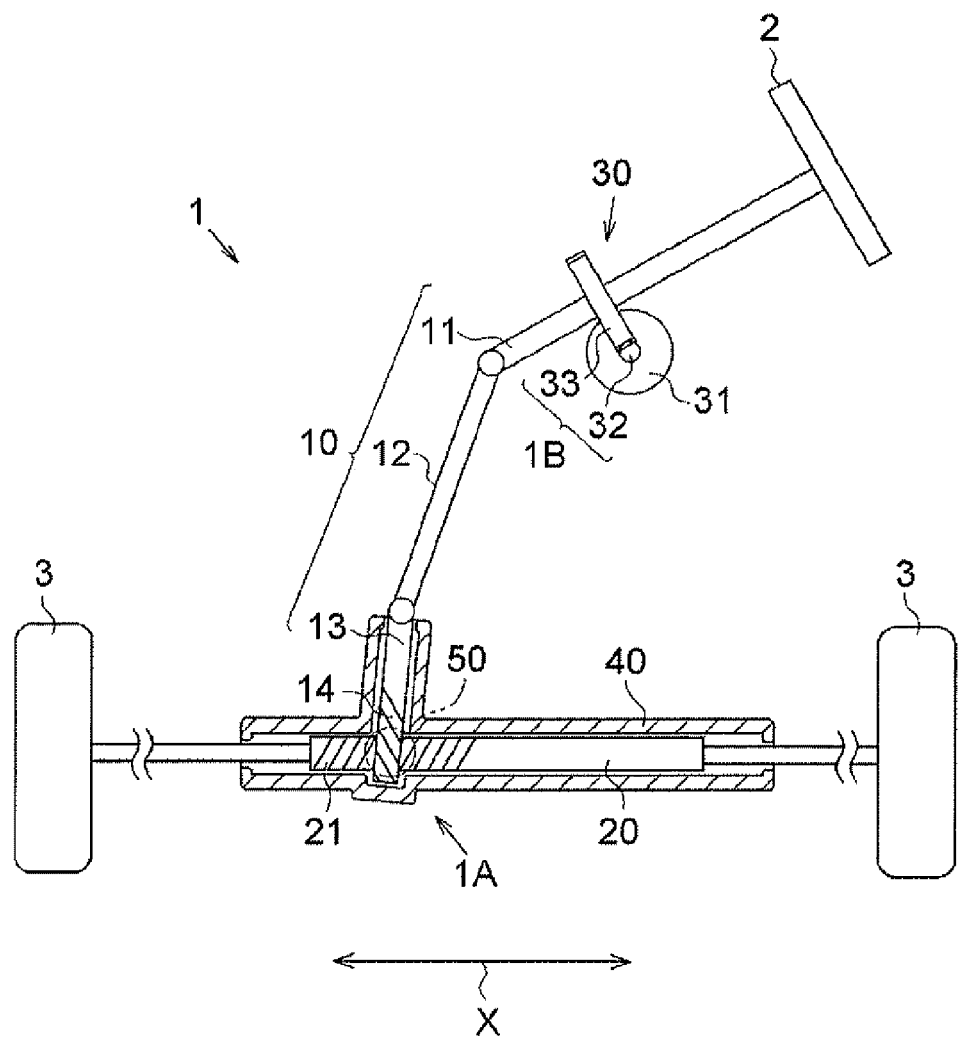
FIG. 1 is a view that shows the overall configuration of a steering system according to an embodiment of the invention.

The configuration of a steering system 1 will be described with reference to FIG. 1. The steering system 1 includes a steering shaft 10, a rack shaft 20, an assist device 30, a housing 40 and a rack guide mechanism 50.

The steering shaft 10 includes a column shaft 11, an intermediate shaft 12 and a pinion shaft 13. A steering wheel 2 is fixed to the column shaft 11. The column shaft 11 transmits the rotation of the steering wheel 2 to the pinion shaft 13 via the intermediate shaft 12. The intermediate shaft 12 connects the column shaft 11 and the pinion shaft 13 to each other. The pinion shaft 13 has a plurality of pinion teeth 14. The pinion teeth 14 constitute a rack-and-pinion mechanism 1A.

The rack shaft 20 has a plurality of rack teeth 21. The rack teeth 21 constitute the rack-and-pinion mechanism 1A. Due to meshing of the rack teeth 21 with the pinion teeth 14, the rack shaft 20 moves in accordance with the rotation of the pinion shaft 13. Steered wheels 3 are connected to the rack shaft 20.

The assist device 30 includes an electric motor 31, a worm shaft 32 and a worm wheel 33. The worm shaft 32 is rotated by the electric motor 31. The worm wheel 33 rotates together with the column shaft 11. The worm wheel 33 is in mesh with the worm shaft 32. The worm shaft 32 and the worm wheel 33 constitute a speed reduction mechanism 1B.

The operation of the steering system 1 will be described. The steering shaft 10 rotates in accordance with the rotation of the steering wheel 2. The rack-and-pinion mechanism 1A converts the rotational motion of the pinion shaft 13 into a linear motion of the rack shaft 20. The rack shaft 20 moves in its axial direction indicated by an arrow X in the drawings. As the rack shaft 20 moves in the axial direction X, the orientation of the steered wheels 3 is changed. The assist device 30 applies assist torque for assisting movement of the rack shaft 20 to the steering shaft 10 by driving the electric motor 31 on the basis of an output from a torque sensor (not shown) while the steering shaft 10 is rotating. The torque sensor detects a torque applied to the steering shaft 10.

Figure 2:
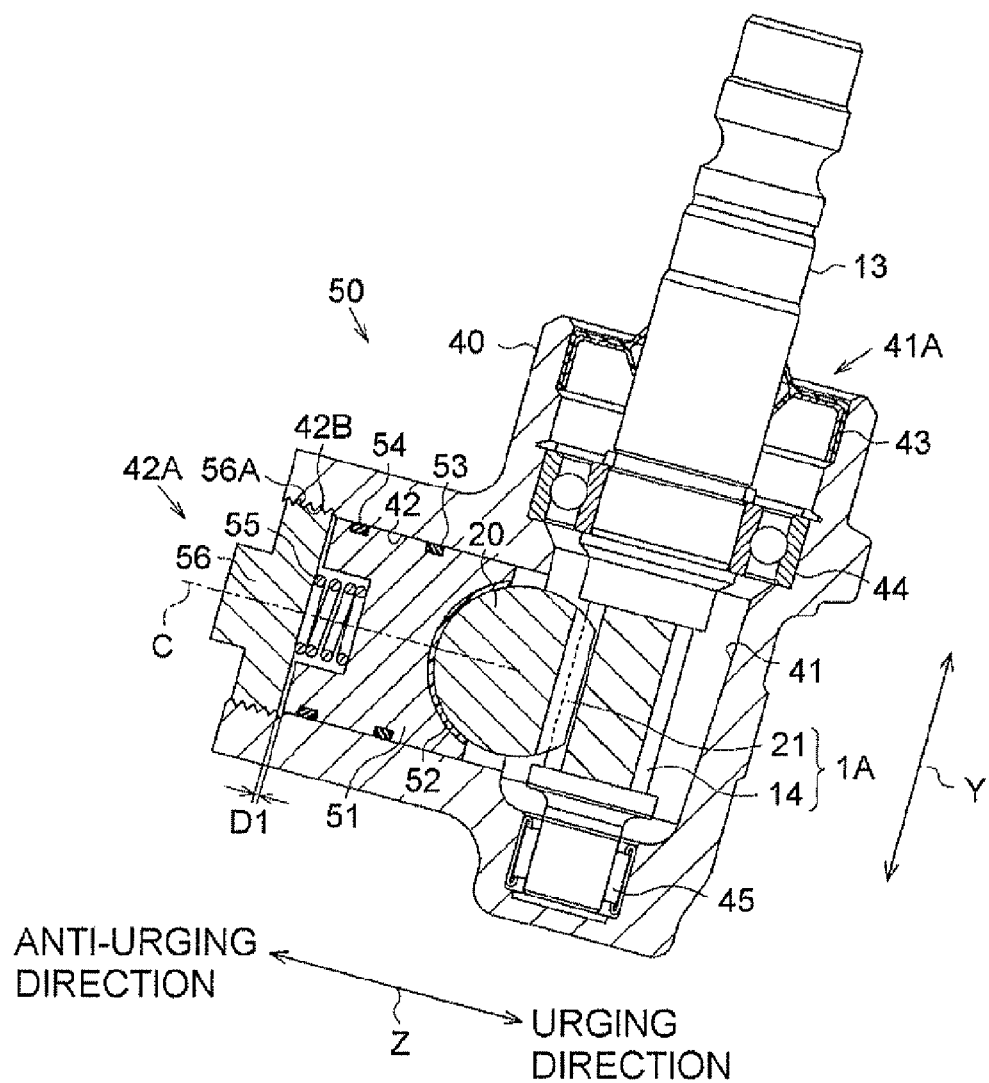
FIG. 2 is a sectional view related to the steering system according to the embodiment, and showing the structure on a section that is perpendicular to the axial direction of a rack shaft shown in FIG. 1.

The housing 40 and the rack guide mechanism 50 will be described with reference to FIG. 2. FIG. 2 shows a cross section of the housing 40 and members accommodated therein, which is perpendicular to the axial direction X of the rack shaft 20 and taken along an axial direction Y of the pinion shaft 13.

The housing 40 includes a first accommodation portion 41, a second accommodation portion 42, a seal member 43, a bearing 44 and a bearing 45. The first accommodation portion 41 accommodates a portion of the rack shaft 20, which includes the rack teeth 21, a portion of the pinion shaft 13, which includes the pinion teeth 14, the seal member 43, the bearing 44 and the bearing 45. The first accommodation portion 41 has an opening 41A through which the pinion shaft 13 is inserted in the housing 40.

The second accommodation portion 42 accommodates a support yoke 51, elastic members 53, 54, an urging member 55, and part of a restricting member 56. The second accommodation portion 42 has an opening 42A through which the support yoke 51 is inserted in the housing 40.

The seal member 43 is arranged between the pinion shaft 13 and the housing 40, at the opening 41A of the first accommodation portion 41. The seal member 43 inhibits entry of foreign matter into the housing 40 through the opening 41A.

The bearing 44 supports a portion of the pinion shaft 13, which is above the pinion teeth 14. The bearing 45 supports a portion of the pinion shaft 13, which is below the pinion teeth 14. The bearing 44 and the bearing 45 are arranged at positions spaced apart from each other in the axial direction Y of the pinion shaft 13.

The rack guide mechanism 50 includes the support yoke 51, a seat member 52, an O-ring that serves as the elastic member 53, an O-ring that serves as the elastic member 54, a coil spring that serves as the urging member 55, and a plug that serves as the restricting member 56.

The support yoke 51 is located between the rack shaft 20 and the urging member 55. The support yoke 51 is configured to be movable in a moving direction Z within the housing 40. The support yoke 51 guides movement of the rack shaft 20 in the axial direction X, and presses the rack shaft 20 against the pinion shaft 13 via the seat member 52. That is, the support yoke 51 supports the rack shaft 20, and guides movement of the rack shaft 20.

The seat member 52 is made of a resin that has an excellent abrasion resistance and has a low coefficient of friction against the rack shaft 20. The seat member 52 abrades due to movement of the rack shaft 20 in the axial direction X.

The elastic members 53, 54 are located between the support yoke 51 and the housing 40 in a direction perpendicular to the moving direction Z. The elastic members 53, 54 are located at positions spaced apart from each other in the moving direction Z. The elastic members 53, 54 are the O-rings made of a resin having elasticity.

The urging member 55 is located between the support yoke 51 and the restricting member 56 in the moving direction Z. The urging member 55 is the coil spring. The urging member 55 urges the support yoke 51 in an urging direction in which the rack shaft 20 is pressed against the pinion shaft 13. That is, the urging member 55 applies a force, which acts in the urging direction of the moving direction Z, to the support yoke 51.

The restricting member 56 is located at the opening 42A of the second accommodation portion 42. The restricting member 56 has an external thread 56A. The external thread 56A is screwed to an internal thread 42B that is formed in the second accommodation portion 42. That is, the restricting member 56 is a screw-in member, and is fixed to the second accommodation portion 42 of the housing 40. The restricting member 56 closes the opening 42A of the second accommodation portion 42, and restricts movement of the support yoke 51 in an anti-urging direction that is a direction opposite to the urging direction. A force that is applied from the urging member 55 to the support yoke 51 changes on the basis of a clearance D1 between the support yoke 51 and the restricting member 56.

The configuration of the rack shaft 20 will be described in detail with reference to FIG. 3A to FIG. 3D. FIG. 3A shows a cross section of the rack shaft 20, which is perpendicular to the axial direction Y of the pinion shaft 13.

As shown in FIG. 3A, the rack shaft 20 has the rack teeth 21 within a predetermined stroke region 22. The stroke region 22 has a center region 22A, end regions 22C and intermediate regions 22B. The center region 22A includes the center position of the stroke region 22. Each end region 22C includes a corresponding one of end positions of the stroke region 22. Each intermediate region 22B is located between the center region 22A and a corresponding one of the end regions 22C. The center region 22A includes a symmetry line M that is perpendicular to the axial direction X of the rack shaft 20. The rack teeth 21 in the stroke region 22 are formed so as to be line-symmetric with respect to an axis that coincides with the symmetry line M. The rotation angle of the pinion shaft 13 at the time when one of the pinion teeth 14 meshes with the rack teeth 21 in the center region 22A of the stroke region 22 is defined as 0°.

The rack teeth 21 form a variable gear in which the ratio of a displacement of the rack shaft 20 to a predetermined amount of change in the rotation angle of the pinion shaft 13 varies. That is, a pitch D2 between adjacent two rack teeth 21 varies on the basis of the position of each rack tooth 21.

FIG. 3B is an enlarged view of a center portion S1 in FIG. 3A. As shown in FIG. 3B, each rack tooth 21 in the center region 22A has a pressure angle of, for example, 29°. An angle α in the drawing denotes the pressure angle. That is, the pressure angle is equal to an acute angle formed between a direction perpendicular to the axial direction X of the rack shaft 20 and an inclined surface 21A of each rack tooth 21.

The inclined surface 21A is inclined with respect to the direction perpendicular to the axial direction X of the rack shaft 20.

FIG. 3C is an enlarged view of each intermediate portion S2 in FIG. 3A. As shown in FIG. 3C, each rack tooth 21 in each intermediate region 22B has a pressure angle smaller than that of each rack tooth 21 in the center region 22A, for example, a pressure angle of 20°.

FIG. 3D is an enlarged view of each of both end portions S3 in FIG. 3A. As shown in FIG. 3D, each rack tooth 21 in each end region 22C has a pressure angle larger than that of each rack tooth 21 in each intermediate region 22B, and has a pressure angle smaller than that of each rack tooth 21 in the center region 22A. For example, each rack tooth 21 in each end region 22C has a pressure angle of 35°.

Figure 4:
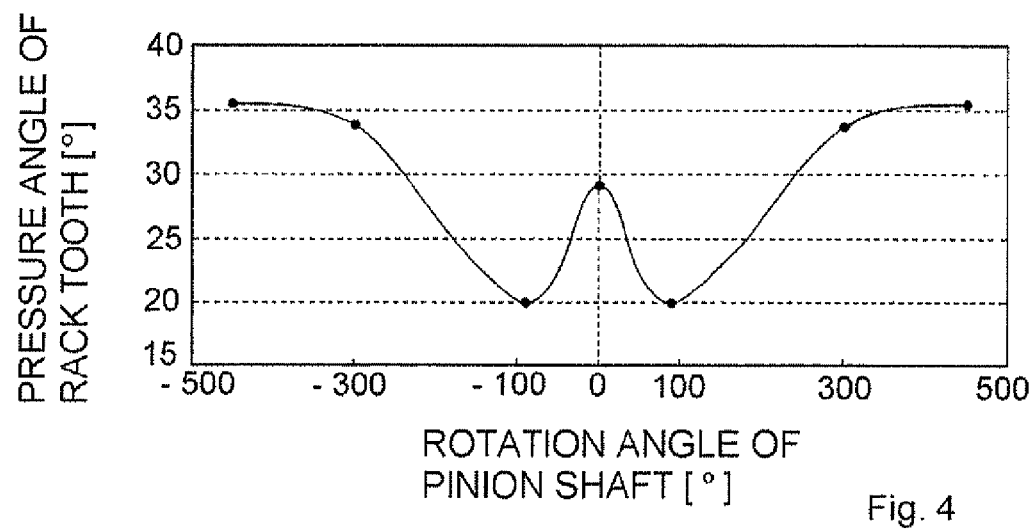
FIG. 4 is a graph that shows the correlation between a rotation angle of a pinion shaft and a pressure angle of each of the rack teeth in the steering system according to the embodiment.

An example of variation in the pressure angles of the rack teeth 21 will be described with reference to FIG. 4. When the rotation angle of the pinion shaft 13 is 0°, the pressure angle of each rack tooth 21 that meshes with the pinion teeth 14 is 29°. As the rotation angle of the pinion shaft 13 approaches from 0° to 90°, the pressure angle of each rack tooth 21 that meshes with the pinion teeth 14 decreases. When the rotation angle of the pinion shaft 13 is 90°, the pressure angle of each rack tooth 21 that meshes with the pinion teeth 14 is 20°. As the rotation angle of the pinion shaft 13 approaches from 90° to 300°, the pressure angle of each rack tooth 21 that meshes with the pinion teeth 14 increases. When the rotation angle of the pinion shaft 13 is 300°, the pressure angle of each rack tooth 21 that meshes with the pinion teeth 14 is approximately 33°. As the rotation angle of the pinion shaft 13 approaches from 300° to 450°, the pressure angle of each rack tooth 21 that meshes with the pinion teeth 14 increases. A variation in the pressure angles that occurs while the rotation angle of the pinion shaft 13 changes from 300° to 450° is smaller than a variation in the pressure angles that occurs while the rotation angle of the pinion shaft 13 changes from 90° to 300°. When the rotation angle of the pinion shaft 13 is 450°, the pressure angle of each rack tooth 21 that meshes with the pinion teeth 14 is approximately 36°.

When the rotation angle of the pinion shaft 13 is larger than or equal to 80° and smaller than or equal to 100°, the rack teeth 21 in one of the intermediate regions 22B of the stroke region 22 mesh with the pinion teeth 14. When the rotation angle of the pinion shaft 13 is larger than or equal to 300°, the rack teeth 21 in one of the end regions 22C of the stroke region 22 mesh with the pinion teeth 14. Therefore, the pressure angle of each rack tooth 21 that meshes with the pinion teeth 14 when the rotation angle of the pinion shaft 13 is larger than or equal to 80° and smaller than or equal to 100°, is the minimum pressure angle among the pressure angles of the rack teeth 21 in the entire range of the stroke region 22. Each rack tooth 21 in each of the end regions 22C of the stroke region 22 has a pressure angle larger than 30°. In the entire range of the stroke region 22, the pressure angle of each of the rack teeth 21 is larger than or equal to 20°.

Figure 5:
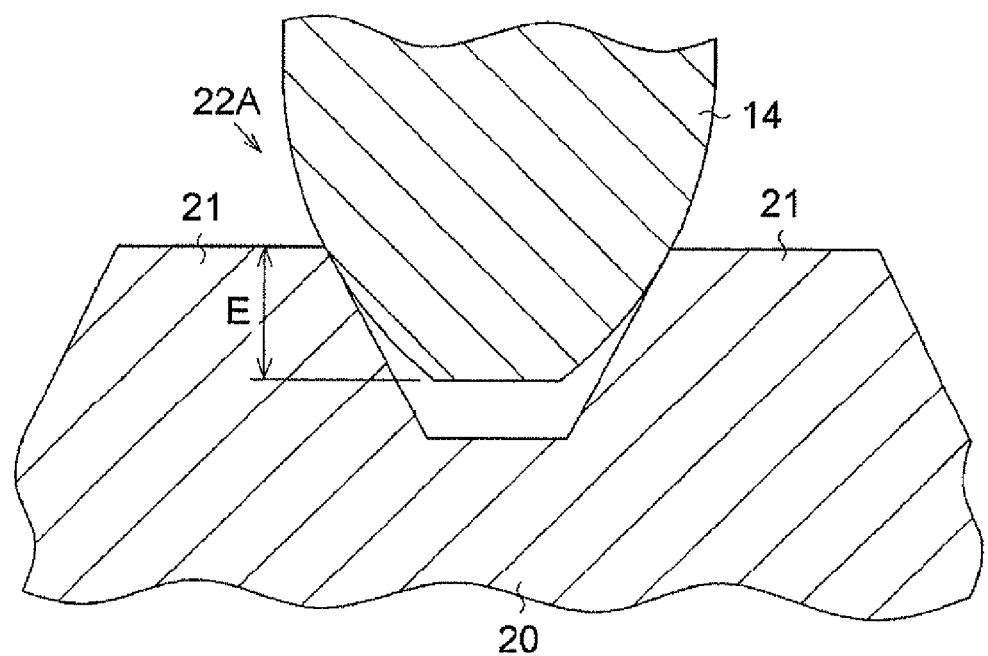
FIG. 5 is a schematic view that shows meshing between one of pinion teeth and the rack teeth in a center region in the steering system according to the embodiment.

The operation of the rack teeth 21 will be described. As shown in FIG. 5, when the rotation angle of the pinion shaft 13 shown in FIG. 2 is 0°, one of the pinion teeth 14 meshes with the rack teeth 21 in the center region 22A. At this time, the clearance D1 between the support yoke 51 and the restricting member 56 has a predetermined size, for example, 60 μm. An arrow E in the drawing indicates the depth by which the pinion tooth 14 meshes with the rack teeth 21.

Figure 6:
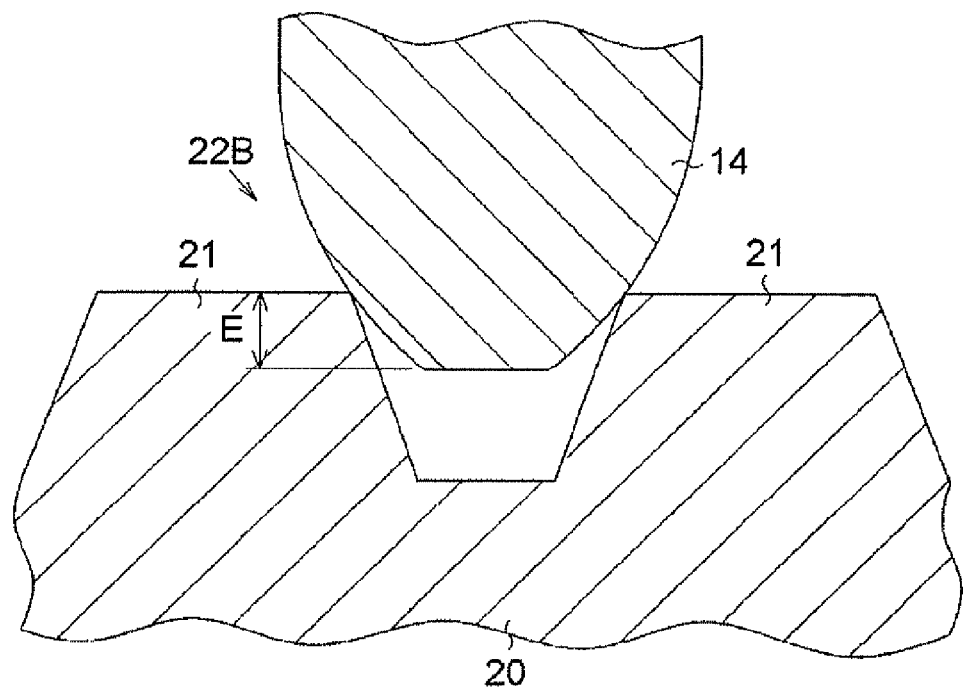
FIG. 6 is a schematic view that shows meshing between one of the pinion teeth and the rack teeth in each intermediate region in the steering system according to the embodiment.

As shown in FIG. 6, when the rotation angle of the pinion shaft 13 shown in FIG. 2 is 90°, the pinion teeth 14 mesh with the rack teeth 21 in one of the intermediate regions 22B. At this time, the depth by which each pinion tooth 14 meshes with the rack teeth 21 in the intermediate region 22B is smaller than that when each pinion tooth 14 meshes with the rack teeth 21 in the center region 22A. Therefore, when the rotation angle of the pinion shaft 13 is 90°, the support yoke 51 shown in FIG. 2 is located closer to the restricting member 56 in the anti-urging direction than when the rotation angle of the pinion shaft 13 is 0°, and the clearance D1 between the support yoke 51 and the restricting member 56 is, for example, 50 μm.

Figure 7:
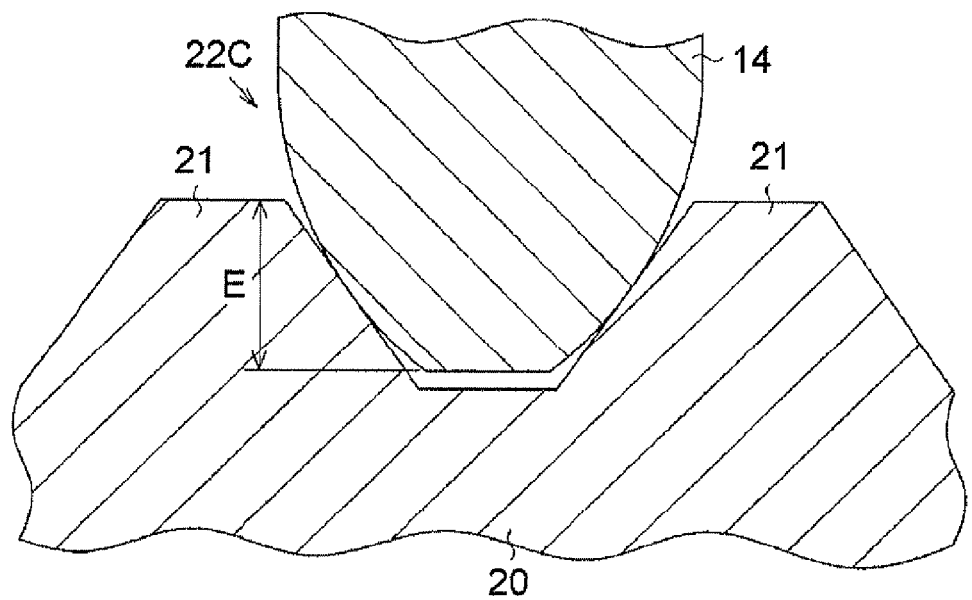
FIG. 7 is a schematic view that shows meshing between one of the pinion teeth and the rack teeth in each end region in the steering system according to the embodiment.

As shown in FIG. 7, when the rotation angle of the pinion shaft 13 is 450°, the pinion teeth 14 mesh with the rack teeth 21 in one of the end regions 22C. At this time, the depth by which each pinion tooth 14 meshes with the rack teeth 21 in the end region 22C is larger than that when each pinion tooth 14 meshes with the rack teeth 21 in each intermediate region 22B and the center region 22A. Therefore, when the rotation angle of the pinion shaft 13 is 45°, the support yoke 51 shown in FIG. 2 is located farther from the restricting member 56 in the urging direction than when the rotation angle of the pinion shaft 13 is 90° or 0°, and the clearance D1 between the support yoke 51 and the restricting member 56 is, for example, 100 μm.

The steering system 1 according to the present embodiment produces the following advantageous effects.

(1) The magnitude of force that is applied to the rack shaft 20 from the urging member 55 changes on the basis of the size of the clearance D1 between the end portion of the support yoke 51 in the anti-urging direction and the restricting member 56. The size of the clearance D1 changes on the basis of the position of the support yoke 51 with respect to the restricting member 56. The position of the support yoke 51 with respect to the restricting member 56 changes on the basis of the relative position between the rack shaft 20 and the pinion shaft 13. The relative position changes on the basis of the depth of meshing between the rack tooth 21 and the pinion tooth 14. The depth of meshing between the rack tooth 21 and the pinion tooth 14 changes on the basis of the pressure angle of each of the rack teeth 21. Therefore, by varying the pressure angle of the rack teeth 21, it is possible to change the size of the clearance D1, that is, to change the magnitude of force that is applied to the rack shaft 20 from the urging member 55. In consideration of these facts, in the steering system 1, the pressure angle of each of the rack teeth 21 included in each of the intermediate regions 2213 is set smaller than the pressure angle of each of the rack teeth 21 included in each of the center region 22A and the end regions 22C. Therefore, when the rack teeth 21 included in each of the intermediate regions 2213 mesh with the pinion teeth 14, the depth of meshing between the rack tooth 21 and the pinion tooth 14 becomes relatively small. Due to a decrease in the clearance D1, the force that is applied to the rack shaft 20 from the urging member 55 increases. Therefore, when the pinion shaft 13 rotates, the rack teeth 21 are less likely to separate from the pinion teeth 14. As a result, gear rattle is less likely to be generated between the rack teeth 21 and the pinion teeth 14. When the rack teeth 21 included in each of the center region 22A and the end regions 22C mesh with the pinion teeth 14, the depth of meshing between the rack tooth 21 and the pinion tooth 14 becomes relatively large. Due to an increase in the clearance D1, the force that is applied to the rack shaft 20 from the urging member 55 decreases. Therefore, rotational resistance against the pinion shaft 13 decreases, and, as a result, the steering feel improves. As described above, the steering system 1 produces the effect of suppressing generation of gear rattle and the effect of improving the steering feel. That is, it is possible to suppress generation of gear rattle and also to improve the steering feel.

(2) The steering system 1 is configured such that the pressure angle of each rack tooth 21 in the stroke region 22 varies, in order to suppress generation of gear rattle and also to improve the steering feel. In addition, the steering gear ratio is varied with the use of this structure. Therefore, it is possible to suppress generation of gear rattle, to improve the steering feel and to change the steering performance on the basis of a driving situation of a vehicle.

(3) The pressure angle of each rack tooth 21 included in each of the end regions 22C is larger than the pressure angle of each rack tooth 21 included in the center region 22A. Therefore, in the steering system 1, when the rack teeth 21 included in each of the end regions 22C mesh with the pinion teeth 14, the depth of meshing between the rack tooth 21 and the pinion tooth 14 is larger than that when the rack teeth 21 included in the center region 22A mesh with the pinion teeth 14. Accordingly, the force that is applied to the rack shaft 20 from the urging member 55 decreases. Therefore, in a steering state where the rotation angle of the pinion shaft 13 is large, the effect of improving the steering feel further improves.

(4) Each of the intermediate regions 22B includes the rack teeth 21 having the minimum pressure angle among all the rack teeth 21 included in the stroke region 22, whereas the center region 22A and each of the end regions 22C do not include the rack teeth 21 having the minimum pressure angle. Therefore, in the steering system 1, when the rack teeth 21 having the minimum pressure angle, which are included in each of the intermediate regions 22B, mesh with the pinion teeth 14, the depth of meshing between the rack tooth 21 and the pinion tooth 14 is the smallest. Therefore, within the range in which the force of the urging member 55 changes under the influence of the depth of meshing between the rack tooth 21 and the pinion tooth 14, the force that is applied to the rack shaft 20 from the urging member 55 becomes the largest. Therefore, when the rotation angle of the pinion shaft 13 falls within the range larger than or equal to 80° and smaller than or equal to 100°, the effect of suppressing generation of gear rattle becomes the highest.

(5) In broaching that is an ordinary method of forming rack teeth, it is difficult to form a pressure angle larger than 30°. Therefore, ordinary rack teeth have a pressure angle smaller than or equal to 30°. The rack teeth 21 included in each of the end regions 22C have a pressure angle larger than 30°. Therefore, in the steering system 1, when the rack teeth 21 included in each of the end regions 22C mesh with the pinion teeth 14, the depth of meshing between the rack tooth 21 and the pinion tooth 14 is larger than that when the rack teeth 21 having a pressure angle smaller than or equal to 30° mesh with the pinion teeth 14. Therefore, the force that is applied to the rack shaft 20 from the urging member 55 decreases. Accordingly, rotational resistance against the pinion shaft 13 decreases, and, as a result, the steering feel improves.

(6) In the steering system 1, all the rack teeth 21 included in the stroke region 22 have a pressure angle larger than or equal to 20°, that is, the rack teeth 21 having the minimum pressure angle have a pressure angle larger than or equal to 20°. Therefore, in the entire stroke region 22, it is possible to ensure mechanical strength equivalent to that of the ordinary rack teeth 21.

The invention includes embodiments other than the above-described embodiment. Hereinafter, modified examples of the above-described embodiment will be described as other embodiments of the invention. The following modified examples may be combined with each other.

In the steering system 1 according to the embodiment, in the entire range of the stroke region 22, the pressure angle of each of the rack teeth 21 is larger than or equal to 20°. Alternatively, in the steering system 1 according to a modified example, the rack teeth 21 in each of the intermediate regions 22B may have a pressure angle smaller than 20°. That is, it is not necessary that all the rack teeth 21 have a pressure angle larger than or equal to 20° throughout the entire range of the stroke region 22, that is, some of the rack teeth 21 may have a pressure angle smaller than 20°.

In the steering system 1 according to the embodiment, the rack teeth 21 in each of the end regions 22C of the stroke region 22 may have a pressure angle larger than 30°. Alternatively, in the steering system 1 according to a modified example, the rack teeth 21 in each of the end regions 22C may have a pressure angle smaller than or equal to 30°. That is, the pressure angle of the rack teeth 21 in each of the end regions 22C may be changed as needed.

In the steering system 1 according to the embodiment, the pressure angle of the rack teeth 21 in the center region 22A of the stroke region 22 may be smaller than the pressure angle of the rack teeth 21 in each of the end regions 22C of the stroke region 22. Alternatively, in the steering system 1 according to a modified example, the pressure angle of the rack teeth 21 in the center region 22A of the stroke region 22 may be equal to the pressure angle of the rack teeth 21 in each of the end regions 22C of the stroke region 22 or may be larger than the pressure angle of the rack teeth 21 in each of the end regions 22C of the stroke region 22. That is, the pressure angles of the rack teeth 21 may be changed as needed, as long as the pressure angle of each rack tooth 21 in the center region 22A is larger than the pressure angle of the rack teeth 21 in each of the intermediate regions 22B and the pressure angle of the rack teeth 21 in each of the end regions 22C is larger than the pressure angle of the rack teeth 21 in each of the intermediate regions 22B.

The pressure angle of the rack teeth 21 in the center region 22A, the pressure angle of the rack teeth 21 in each of the intermediate regions 22B and the pressure angle of the rack teeth 21 in each of the end regions 22C are not limited to the numeric values illustrated in the embodiment.

In the steering system 1 according to the embodiment, at a predetermined angle within the range of the rotation angle of the pinion shaft 13, which is larger than or equal to 80° and smaller than or equal to 100°, the pressure angle of each rack tooth 21 that meshes with the pinion tooth 14 is the minimum pressure angle. Alternatively, in the steering system 1 according to a modified example, at all the angles within the range of the rotation angle of the pinion shaft 13, which is larger than or equal to 80° and smaller than or equal to 100°, the pressure angle of each rack tooth 21 that meshes with the pinion tooth 14 may be the minimum pressure angle. That is, a plurality of the rack teeth 21 may have the minimum pressure angle.

In the steering system 1 according to the embodiment, the urging member 55 is a coil spring, Alternatively, in the steering system 1 according to a modified example, the urging member 55 may be a belleville spring. That is, as long as it is possible to apply a force to the support yoke 51, the shape or material of the urging member 55 may be changed.

The steering system 1 according to the embodiment is a column assist-type power steering system that applies the power output from the electric motor 31 to the column shaft 11. Alternatively, a steering system according to a modified example may be a rack assist-type power steering system that applies the power output from an electric motor to a rack shaft as a force that transversely moves the rack shaft or a pinion assist-type power steering system that applies the power output from an electric motor to a pinion shaft.

What is claimed is:

1. A steering system, comprising:
a pinion shaft that has a plurality of pinion teeth;
a rack shaft that has a stroke region in which a plurality of rack teeth that mesh with the pinion teeth is formed, and in which the stroke region includes a center region that includes a center position of the stroke region, end regions, each of which includes an end position of the stroke region, and intermediate regions, each of which is located between the center region and one of the end regions, and a pressure angle of each of the rack teeth included in each of the intermediate regions is smaller than a pressure angle of each of the rack teeth included in each of the center region and the end regions;
a support yoke that guides movement of the rack shaft;
an urging member that applies force, which acts in an urging direction that is a direction in which the support yoke is pressed against the rack shaft, to the support yoke; and
a restricting member that is located on a side of the support yoke and the urging member in an anti-urging direction, which is a direction opposite to the urging direction, and that faces, via a clearance, an end portion of the support yoke in the anti-urging direction.

2. The steering system according to claim 1, wherein a steering gear ratio changes on the basis of a variation in the pressure angles of the rack teeth included in the stroke region.

3. The steering system according to claim 1, wherein the pressure angle of each of the rack teeth included in each of the end regions is larger than the pressure angle of each of the rack teeth included in the center region.

4. The steering system according to claim 1, wherein:
one of the pinion teeth meshes with the rack teeth included in the center region when a rotation angle of the pinion shaft with respect to the rack shaft is 0°, and meshes with the rack teeth included in one of the intermediate regions when the rotation angle of the pinion shaft with respect to the rack shaft is larger than or equal to 80° and smaller than or equal to 100°;
each of the intermediate regions includes the rack tooth having a minimum pressure angle among all the rack teeth included in the stroke region; and
the center region and each of the end regions do not include the rack tooth having the minimum pressure angle.

5. The steering system according to claim 1, wherein each of the rack teeth included in each of the end regions has a pressure angle larger than 30°.

6. The steering system according to claim 1, wherein all the rack teeth included in the stroke region have a pressure angle larger than or equal to 20°.

* * * * *